July 14, 1964 P. WAINE 3,140,983
NUCLEAR REACTOR FUEL ELEMENTS
Filed July 11, 1961
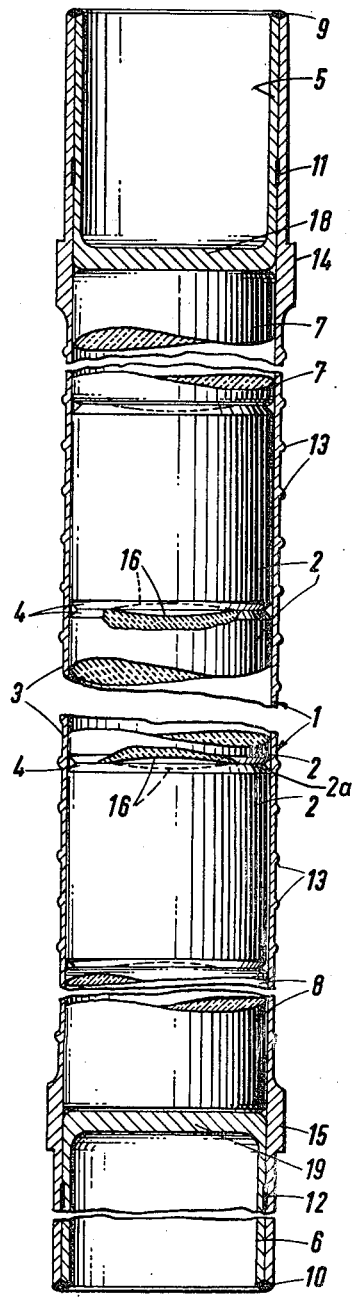
INVENTOR:
BY

3,140,983
NUCLEAR REACTOR FUEL ELEMENTS
Peter Waine, Warrington, England, assignor to United Kingdom Atomic Energy Authority, London, England
Filed July 11, 1961, Ser. No. 123,160
Claims priority, application Great Britain July 12, 1960
3 Claims. (Cl. 176—73)

The invention relates to nuclear reactor fuel elements of the kind having the fuel in the form of a stack of solid pellets of nuclear fuel enclosed in a protective sheath. Such fuel elements are used in nuclear reactors of various types, see for example the disclosures of the "Yankee" pressurised water reactor and the Dresden boiling water reactor in the October 1960 issue of "Nuclear Engineering" and the Advanced Gas-Cooled (A.G.R.) reactor in the April 1961 issue of "Nuclear Engineering."

It does not appear to be practicable to match the thermal expansion of uranium oxide fuel pellets with any suitable sheathing material and accordingly a fuel to sheath differential expansion problem exists. With stainless steel as a sheathing material the problem becomes more acute as the sheath is necessarily made as thin as possible as the neutron absorption of stainless steel is relatively high.

Taking the coefficient of thermal expansion of stainless steel as $19 \times 10^{-6}$ inches/inch/° C. and of uranium dioxide as $10.5 \times 10^{-6}$ inches/inch/° C., with sheath and fuel at uniform temperature the sheath would expand more than the fuel and hence no straining of the sheath would result. However, it has been found that straining does in fact occur.

According to the invention, a fuel element in the form of a stack of solid pellets of nuclear fuel enclosed in a protective sheath is characterised in that the ends of the fuel pellets are shaped to have flat rims around depressions centred on the pellets.

The actual dimensions of the depressions are governed by a number of factors: the strength of the pellet in compression; the thermal conductivity; the relative expansion of sheath and fuel at reactor operating temperature; the length of pellet; the practicability of forming the depressions accurately; the need not to remove fuel needlessly by making the depth of the depressions too great and the diameter of pellet. These factors are generally satisfied with a depth of depression in the range of one hundredth to one thousandth of the length of the pellets and with a diameter of depression in the range of 50% to 80% of the diameter of the pellet.

Typically, for a gas-cooled, graphite-moderated nuclear reactor of 100 mw. (heat) with a core outlet temperature of 525° C., a fuel element sheath temperature of 600° C., a fuel pellet central temperature of 1300° C., the pellets being enriched $UO_2$ and of .4" diameter and .4" length and depressions at both ends of each pellet, each depression should theoretically have a depth of .0006" and a diameter of .28". The forming of a depression of .0006" depth is difficult and a practical depth of .0015" is adopted. The increase of the depth dimension from .0006" to .0015" also provides a factor of safety for unforeseeable growth at the centre regions of the fuel pellets.

The depressions allow a degree of axial expansion of the fuel at the centres where the temperature can rise to a very high upper limit of 1500° C. The depth of the recesses provides that even at this temperature, the centre region of one fuel pellet cannot expand by thermal expansion to contact the centre region of an adjacent fuel pellet.

An embodiment of the invention will now be described by way of example with reference to the accompanying drawing which is a fragmental side view in medial section.

Referring to the drawing, a nuclear reactor fuel element 1 includes a stack of forty seven close-packed, solid $UO_2$ fuel pellets 2 of cylindrical form forming a column within a tight-fitting protective sheath 3 of stainless steel. Each fuel pellet 2 has chamfered ends 4 formed by grinding which provide lead-in surfaces when the fuel pellets 2 are fed into the sheath 3 upon assembly of the fuel element 1.

The ends of the sheath 3 are closed by stainless steel end caps 5, 6 spaced from the column of fuel pellets 2 by heat insulating plugs 7, 8 of sintered alumina. The end caps 5, 6 have a slight taper (.005" per inch of length) so that when assembled they are an interference fit (i.e., a light force fit) in the ends of the sheath 3. Bases 18, 19 of the end caps 5, 6 have a slight radius so that they are easily inserted into their respective ends of the sheath 3. The end caps 5, 6 are sealed to the sheath 3 by argon-arc edge-welds 9, 10 backed up by circumferential resistance welds 11, 12.

The ends of the fuel pellets 2 have flat rims 2a and depressions 16 centred on the pellets. The depressions have a depth determining that stresses set up in the sheath 3 with temperature changes in the fuel are governed by the temperature of the fuel at the periphery of the depressions where the pellets contact one another.

The depressions are of small depth (e.g., .0015" or, in the case of a "single-ended" depression, .003") and allow a degree of axial expansion of the column of fuel pellets 2 at the centres of the pellets (where the temperature can rise to a very high upper limit of 1500°) and even at this temperature the centre region of one fuel pellet 2 cannot contact the centre region of an adjacent fuel pellet.

The fuel pellets 2 are formed from $UO_2$ powder milled and mixed with a binder followed by pressing in moulds to form "green" pellets which are later dried and then sintered at 1600° C. for 3 hours. The depressions 16 are formed in the pressing operation and the finished depth of the depression is determined by grinding the end faces of the pellets 2 to a ±.0005" tolerance.

The external surface of the sheath 3 is provided with a series of circumferential ribs 13 which increase heat transfer and add strength to the sheath. The fuel element 1 is one of twenty-one similar fuel elements forming a fuel element cluster assembly and the ends of the sheath 3 have collars 14, 15 for location and support of the individual fuel elements by grids forming part of the assembly.

The fuel element 1 is assembled in the following manner. First, the end cap 6 is fitted into one end of the sheath 3 and secured thereto by welds 10, 12. The sheath 3 is next evacuated and then heated so that it expands. The fuel pellets 2 and heat insulating plugs 7, 8 are then loaded into the sheath in a helium atmosphere, the expansion of the sheath allowing easy loading. The helium atmosphere is maintained whilst the end cap 5 is fitted into the open end of the sheath 3 and secured to the sheath at first by weld 11 and then by weld 9, the weld 11 being tested for leakage before the weld 9 is made. As the fuel element cools the sheath 3 contracts about the fuel pellets 2.

To test for overall leakage, the fuel element 1 is reheated so that the small amount of helium retained in the sheath 3 expands and the sheath, end caps and edge-welds then monitored with gas-detecting equipment for out-flowing helium. Helium contained in the sheath 3 improves the internal heat transfer properties of the fuel element.

The chamfered ends 4 of the fuel pellets 2 serve a dual function. They allow entry of the fuel pellets 2 into the sheath 3 with reduced risk of breakage of the leading (chamfered) ends and they allow the sheath 3 to be contoured by external pressurisation at the assembly stage to conform with the fuel pellets 2.

Further details of the fuel element 1 are as follows:

| | Inches |
|---|---|
| Length of each fuel pellet 2 | .4 |
| Diameter of each fuel pellet 2 | .4 |
| Total length of stacked fuel pellets 2 | 18.8 |
| Internal diameter of sheath 3 | .4 |
| Thickness of sheath 3 | .015 |
| Length of heat insulating plugs 7, 8 | .380 |
| Overall length of fuel element 1 | 20.4 |
| Length of end caps 4, 5 | .4 |
| Side-wall thickness of end caps 4, 5 | .016 |

To determine the "theoretical" depth and radii of the depressions 16 a hypothetical fuel element with "flat-ended" fuel pellets is taken as a basis for calculations and the highest operating temperatures of its fuel and sheath are calculated. The overall expansions of fuel (at its highest temperature region) and sheath are next determined and their difference divided by the number of fuel pellets in the fuel element to give the average maximum expansion for each pellet relative to the sheath. This average relative expansion is equal to the depth of depression required for a "single-ended" depression and is halved for a "double-ended" depression.

From a curve of calculated operating temperature distribution across a fuel pellet (derived from a knowledge of conductivity and heat flux) a radius is found where a temperature corresponds to equal expansions of fuel and sheath and this radius becomes the radii of the depression.

Typically for a gas-cooled, graphite-moderated nuclear reactor of 100 mw. (heat) output with a core outlet temperature of 575° C., a fuel element 1 as described above operating with a sheath temperature of 600° C., a central fuel temperature of 1300° C. and a fuel temperaure of 1080° C. where fuel expansion equals sheath expansion, the calculated depth of depression 16 for a "double-ended" pellet is .0006" and the radius .14".

Depressions of triangular section or rectangular section could be used although the spherical form is generally preferred as being well suited to forming during a pressing operation and to subsequent grinding.

I claim:

1. A fuel element comprising a tubular sheath, a close-packed column of solid cylindrical pellets in end contact with each other within the sheath, closure members closing-off the ends of the sheath and in contact with the end pellets of the column, a number of said pellets being a nuclear fuel, the ends of the pellets of nuclear fuel having central depressions therein with flat rims bounding said depressions.

2. A fuel element as claimed in claim 1 wherein the depth of depression of each pellet of nuclear fuel is in the range of one thousandth of the length of the pellet and the diameter of the depression is in the range of 50% to 80% of the diameter of the pellet.

3. A fuel element as claimed in claim 1 wherein the depressions defined by the pellets of nuclear fuel have a depth such that stresses set up in the sheath by temperature changes in the pellets of nuclear fuel are governed by the temperature of the pellets at the peripheries of the depressions.

References Cited in the file of this patent

UNITED STATES PATENTS

| 2,871,555 | Foster | Feb. 3, 1959 |
| 2,992,179 | Bassett | July 11, 1961 |
| 3,028,329 | Mahlmeister | Apr. 3, 1962 |

FOREIGN PATENTS

| 1,055,142 | Germany | Apr. 16, 1959 |
| 1,244,632 | France | Sept. 19, 1960 |